Feb. 22, 1927.

O. C. TROUT 1,618,611

GALVANIZED PIPE AND METHOD OF MAKING SAME

Filed Jan. 7, 1925

INVENTOR:
OLIVER. C. TROUT
BY
Fad W Davis
ATTORNEY.

Patented Feb. 22, 1927.

1,618,611

UNITED STATES PATENT OFFICE.

OLIVER C. TROUT, OF LOS ANGELES, CALIFORNIA, ASSIGNOR TO EMSCO DERRICK & EQUIPMENT COMPANY, A CORPORATION OF CALIFORNIA.

GALVANIZED PIPE AND METHOD OF MAKING SAME.

Application filed January 7, 1925. Serial No. 1,122.

This invention relates to casings, such as is used in oil wells, and it particularly relates to what is known as stovepipe casing.

Stovepipe casing is used extensively in the oil industry as well casing for the purpose of preventing cave-ins of the wall of the well and for excluding ground water. Stovepipe casing must be of low cost to compete with the ordinary screw casing and must be strong enough to resist stresses placed thereon when in use. Such casing must also be water-tight to prevent entrance of ground waters to the interior of the casing, and also to allow internal pressure to be placed thereon during cementing. Stovepipe casing now in use generally consists of inner and outer layers which are cylindrical in form, and which are disposed concentrically. It is present practice to secure these two members together either by riveting, welding or by rolling inter-engaging corrugation in the members after they have been placed together. Such means of securing are rather expensive and are not entirely satisfactory as to strength and performance. In the case of riveting, it is necessary to punch holes in the members for the rivets, this making a tendency of the casing to leak about the rivets.

It is an object of this invention to provide a stovepipe casing which is watertight and very strong.

It is a still further object of the invention to provide a novel means for securing the inner and outer layers together.

It is also an object of this invention to provide a stovepipe casing which is proof against corrosion.

It is a further object of the invention to provide a novel method for producing a stovepipe casing having the characteristics as set forth in the above objects. Such a stovepipe casing will be superior to the present casing in many respects. It will be cheaper to produce, and it will have a longer life owing to the fact that it is very strong and because it will not rust. The novel means which I provide for securing the inner and outer members together is such as to allow these members to be made of a very hard material owing to the fact that it requires no rivets, no welding or no rolling of corrugations therein to effect the securing together.

Other objects and advantages of my invention will appear in the following description.

Referring to the drawings which are for illustrative purposes only,

Figure 1:
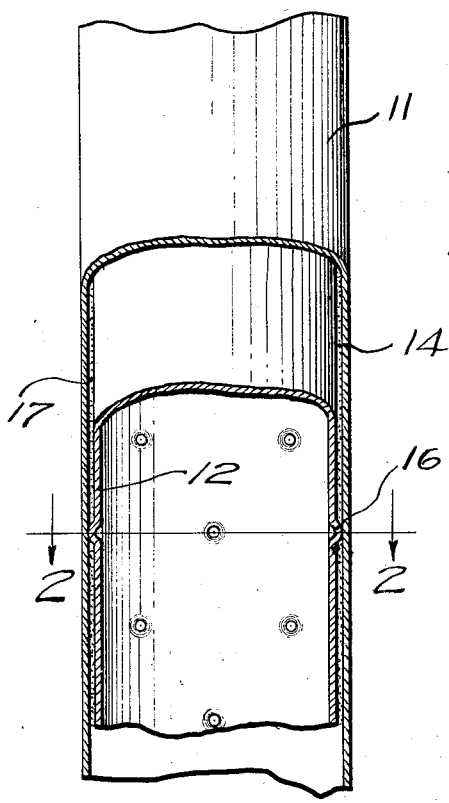
Fig. 1 is a view of a portion of a stovepipe casing embodying the features of my invention, this view being partially sectioned so as to show the essential features thereof.
Figure 2:
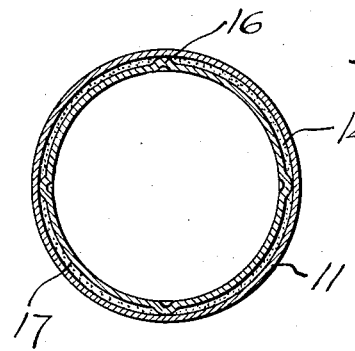
Fig. 2 is a section taken as indicated by the line 2—2 of Fig. 1.

With particular reference to Figs. 1 and 2, my invention comprises an outer tubular member 11 and an inner tubular member 12. These tubular members may be made of flat sheets rolled into cylindrical form and welded or riveted together, or they may be in the form of seamless tubing. The inner tubular member 12 is arranged concentrically inside the outer tubular member 11 so that an annular capillary space 14 exists between the adjacent faces of the members 11 and 12. To retain the member 12 concentric with respect to the outer member 11, I provide spacing portions 16, these spacing portions being formed by forcing portions of the wall of the inner tubular member 12 outwardly at various places, as shown. This serves to make the capillary space 14 of the same thickness throughout its entire length. In the capillary space 14 is a securing and sealing material 17, this material entirely filling the capillary space 14 and adhering to the adjacent walls of the outer and inner tubular members 11 and 12. The material 17 is preferably a galvanizing material such as zinc or spelter which readily flows into the capillary space 14 when the inner and outer casings are dipped in a galvanizing bath, as will be described later. The elements of the stovepipe casing of my invention do not require rivets or rolling to secure them together, and require no puncturing thereof. For this reason, it is possible to make the inner and outer members 11 and 12 of a comparatively hard material, which will be very strong and endure considerable strains as well as friction. The spelter 17 entirely fills the capillary space 14, and for this reason the inner and outer members will efficiently reinforce each other against all strains.

Figure 3:
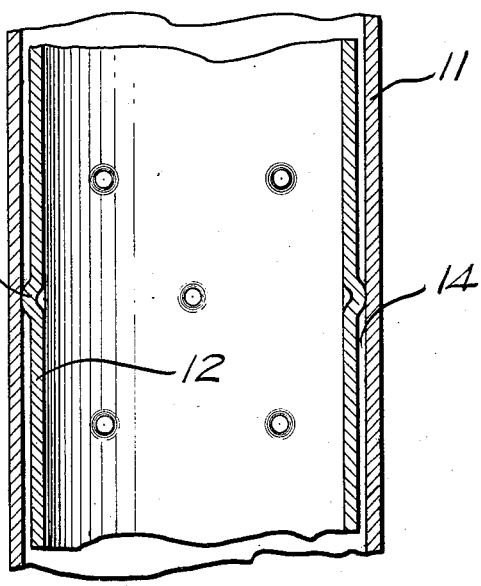
Fig. 3 is a sectional view showing my stovepipe casing in the process of making.

The manner in which stovepipe casing of my invention is produced is substantially as follows:

The inner member 12 being formed into tubular shape is provided with the spacing portions 16, these portions 16 being preferably formed by stamping. If the tubular member 12 is made of a flat sheet which is rolled into circular form, the spacing portions 16 may be formed before the metal sheets are rolled into cylindrical form. The outer tubular member 11 is extended around the inner tubular member 12, as shown in Fig. 3. When in this position, the inner face of the outer tubular member 12 engages with the various spacing portions 16 and causes the capillary space 14 to be of uniform thickness. When the inner and outer tubular members 11 and 12 have thus been assembled, they are dipped in an acid bath so as thoroughly clean all the surfaces of the members.

After this is accomplished, the assembly is then dipped into a galvanizing bath, the galvanizing material adhering to all the surfaces of the inner and outer members 11 and 12. The capillary space 14 is of such a character and size as to draw the hot liquid galvanizing material therein due to capillary action. When the assembly is removed from the galvanizing bath, the galvanizing material in the capillary space 14 will be retained therein due to the capillary action of the capillary space 14. Such capillary action is well understood and the theory thereof need not be discussed here. It is sufficiently strong to retain the galvanizing material within the space 14 until the galvanizing material cools and hardens. After the galvanizing material hardens, it serves to rigidly retain the inner and outer tubular members 11 and 12 together and serves as a means for providing a watertight relationship between these members.

Figure 4:
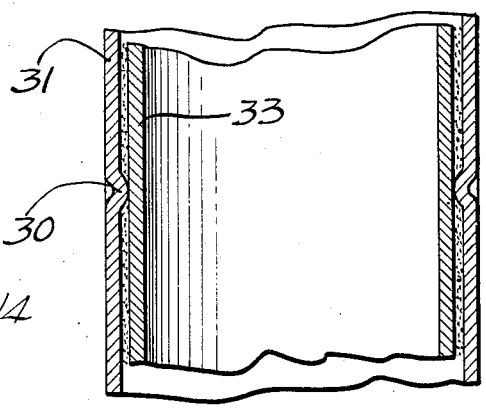
Fig. 4 is a fragmentary sectional view of an alternative form of my invention.

In Fig. 4 I show a form of my invention which has spacing portions 30 provided in an outer tubular member 31 instead of in an inner tubular member 33. In this type of construction, there is no stamping or forming necessary to be performed on the inner member 33. It will be possible then to make this inner member 33 of an extremely hard and strong material, this material being of such a characteristic as to have high frictional qualities, and to withstand considerable wear such as may be placed thereon due to an engagement therewith by a tool joint of a string of drill pipe during drilling of a well.

From the foregoing description, it will be recognized that the casing of my invention will be very cheap to provide owing to the fact that there is practically no work to be done upon the members for securing them together after they have been assembled, other than the galvanizing thereof, this being considerably cheaper than securing the members together by riveting, welding or forming interlocking corrugations therein. The casing will be rust-proof owing to the fact that the surfaces thereof are coated with galvanizing material. The casing is also water-proof due to the novel means for securing the inner and outer members together, the galvanizing material entirely filling the capillary space between the members and efficiently preventing any leakage therebetween.

It is a feature of my invention to provide a stovepipe casing which is very strong. The novel construction and means whereby I secure the inner and outer members together permits the use of very hard and strong materials, owing to the fact that a minimum of stamping is required, this being only on the portion 16, and owing to the fact that there is no riveting or welding or other such operations necessary to the securing of the members together. Further by entirely filling the capillary space 14, there will be no vacant space between the inner and outer members 11 and 12 and, therefore, the members will be directly reinforced by each other and will result in a very strong stovepipe casing.

I claim as my invention:

1. A stovepipe casing comprising: an inner tubular member formed of a hard metal; an outer tubular member formed of a hard metal, said outer tubular member being so situated around said inner member that a space exists between said members; means to maintain said space of uniform thickness; and a soft metallic sealing material filling said space and adhering to both said inner and outer members.

2. A stovepipe casing comprising: an inner tubular member formed of a hard metal; an outer tubular member formed of a hard metal disposed around said inner tubular member, there being a capillary space between said inner and outer members; means formed upon one of said tubular members and projecting within the space between said members to maintain said space of uniform thickness; and means disposed in said capillary space for securing said members together.

3. A stovepipe casing comprising: an inner tubular member; spacing portions formed on the exterior of said inner tubular member; an outer tubular member, said outer tubular member being situated around said inner tubular member and engaging said spacing portions so as to form a capillary space of uniform thickness between said outer and inner tubular members; and a galvanizing substance retained in said capillary space, said galvanizing material adhering to the adjacent faces of said inner and outer tubular members for securing them together.

In testimony whereof, I have hereunto set my hand at Los Angeles, California, this 2nd day of January, 1925.

OLIVER C. TROUT.